United States Patent
Olmstead et al.

(10) Patent No.: US 11,600,073 B2
(45) Date of Patent: *Mar. 7, 2023

(54) IMAGING SYSTEMS AND METHODS FOR TRACKING OBJECTS

(71) Applicant: Datalogic USA, Inc., Eugene, OR (US)

(72) Inventors: Bryan Olmstead, Eugene, OR (US); Isaac Gremmer, San Antonio, TX (US); Michele Macchia, Bologna (IT)

(73) Assignee: Datalogic USA, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,422

(22) Filed: Jan. 10, 2022

(65) Prior Publication Data

US 2022/0130150 A1    Apr. 28, 2022

Related U.S. Application Data

(63) Continuation of application No. 17/183,235, filed on Feb. 23, 2021, now Pat. No. 11,222,212, which is a
(Continued)

(51) Int. Cl.
*H04N 5/225* (2006.01)
*G06V 20/52* (2022.01)
(Continued)

(52) U.S. Cl.
CPC ......... *G06V 20/52* (2022.01); *G06Q 30/0601* (2013.01); *G07G 1/0045* (2013.01);
(Continued)

(58) Field of Classification Search
CPC ......... H04N 5/225; H04N 5/253; H04N 7/18; G06Q 30/0601; G07G 1/0045; G08B 13/19643
(Continued)

(56) References Cited

U.S. PATENT DOCUMENTS

| 5,430,480 A | 7/1995 | Allen et al. |
| 6,215,519 B1 | 4/2001 | Nayar et al. |

(Continued)

FOREIGN PATENT DOCUMENTS

| EP | 0878965 A2 | 11/1998 |
| EP | 3098751 A1 | 11/2016 |

(Continued)

OTHER PUBLICATIONS

Almeida et al., "Real-Time Tracking of Moving Objects Using Particle Filters," Proceedings of the IEEE International Symposium on Industrial Electronics: 1327-1332, 2005.
(Continued)

*Primary Examiner* — Trang U Tran
(74) *Attorney, Agent, or Firm* — Cozen O'Connor

(57) ABSTRACT

A first imager has a relatively high resolution and a relatively narrow first field-of-view. Information about objects in an environment is detected or captured, and used to steer the first field-of-view of the first imager. The sensor(s) may take the form of a second imager with a relatively lower resolution and relatively wider second field-of-view. Alternatively, other types of sensors, for instance presence/absence sensors may be employed. The first field-of-view may be directed toward an object that satisfies one or more conditions, for instance matching a particular SKU. The first field-of-view may track a moving object, for instance via a tracking mirror and actuator. This approach may be employed in retail locations, for example in grocery or convenience stores, for instance to reduce various forms of theft or in industrial environments.

20 Claims, 9 Drawing Sheets

Related U.S. Application Data continuation of application No. 15/762,997, filed as application No. PCT/US2016/053555 on Sep. 23, 2016, now Pat. No. 10,936,881.

(60) Provisional application No. 62/222,595, filed on Sep. 23, 2015.

(51) Int. Cl.
    *G08B 13/196*   (2006.01)
    *G07G 1/00*     (2006.01)
    *H04N 7/18*     (2006.01)
    *G06Q 30/0601*  (2023.01)

(52) U.S. Cl.
    CPC ....... *G08B 13/19643* (2013.01); *H04N 5/225* (2013.01); *H04N 7/18* (2013.01)

(58) Field of Classification Search
    USPC ............................................. 348/169, 36, 39
    See application file for complete search history.

(56) References Cited

U.S. PATENT DOCUMENTS

| | | | |
|---|---|---|---|
| 6,215,915 B1 | 4/2001 | Reyzin | |
| 6,590,695 B1 | 7/2003 | Kurtz et al. | |
| 7,973,834 B2 | 7/2011 | Yang | |
| 7,983,565 B2 | 7/2011 | Varshneya et al. | |
| 8,072,482 B2 | 12/2011 | Gibbs et al. | |
| 8,203,702 B1 | 6/2012 | Kane et al. | |
| 8,289,392 B2 | 10/2012 | Senior et al. | |
| 8,681,260 B2 | 3/2014 | Bush | |
| 9,071,742 B2 | 6/2015 | Birkbeck et al. | |
| 9,071,819 B2 | 6/2015 | Kia et al. | |
| 9,606,209 B2 * | 3/2017 | Ernst | G01R 33/56509 |
| 9,717,461 B2 * | 8/2017 | Yu | G01R 33/283 |
| 9,851,563 B2 | 12/2017 | Gao et al. | |
| 10,825,010 B2 | 11/2020 | Olmstead et al. | |
| 2006/0056056 A1 | 3/2006 | Ahiska et al. | |
| 2008/0042042 A1 | 2/2008 | King et al. | |
| 2008/0117296 A1 | 5/2008 | Egnal et al. | |
| 2011/0063446 A1 | 3/2011 | McMordie et al. | |
| 2011/0292406 A1 | 12/2011 | Hollenbeck et al. | |
| 2012/0307084 A1 | 12/2012 | Mantzel et al. | |
| 2013/0021474 A1 | 1/2013 | Taylor et al. | |
| 2014/0029796 A1 | 1/2014 | Fiorini et al. | |
| 2015/0012396 A1 | 1/2015 | Puerini et al. | |
| 2015/0029339 A1 | 1/2015 | Kobres et al. | |
| 2015/0085150 A1 | 3/2015 | Silverstein | |
| 2015/0122890 A1 | 5/2015 | Olmstead et al. | |

FOREIGN PATENT DOCUMENTS

| | | |
|---|---|---|
| GB | 2537405 A | 10/2016 |
| WO | 2013152205 A1 | 10/2013 |

OTHER PUBLICATIONS

International Search Report and Written Opinion of the International Searching Authority, dated Feb. 9, 2017, for International Application No. PCT/US2016/053555, 22 pages.

International Search Report and Written Opinion, dated Mar. 2, 2018, for International Application No. PCT/US2017/067565, 21 pages.

Wikipedia, "Rolling Shutter," downloaded from https://en.wikipedia.org/wlindex/php?title=Rolling_shutter&oldid=642645523 on Dec. 7, 2016, 4 pages.

* cited by examiner

IMAGING SYSTEMS AND METHODS FOR TRACKING OBJECTS

BACKGROUND

Technical Field

The present disclosure relates to imager based systems, for example image-based systems that automatically detect, monitor and track objects in an environment, for instance in a retail store.

Description of the Related Art

Many applications would benefit by automated detection, monitoring or tracking of objects in the respective environment. For example, retail, warehouse, baggage sorting, parcel sorting, or gaming casino environments may benefit by automated detection, monitoring or tracking of objects using image-based techniques.

In many applications or environments, objects to be monitored or tracked are moving or in transit. Camera systems designed to capture images of moving objects typically employ a global shutter imager with short exposure time, and often employing pulsed illumination.

For example, a retail environment (e.g., grocery or convenience store) may employ ceiling mounted cameras used for detection of items in shopping carts. Such cameras must be capable of capturing relatively high-resolution images in order to discern the specific objects or items. In particular, machine vision algorithms require a certain number of pixels in order to properly identify objects or items. Thus, when a large area is to be covered, a camera or imager mounted in a ceiling would have to have a very high resolution. As an estimate, in order to recognize items as small as 5 inches by 5 inches in size (e.g., a box of Tide® laundry detergent), an image would require approximately 200 pixels by 200 pixels. At approximately 40 pixels per inch, a 5 Megapixel imager could only cover an area of about 5 feet by 4 feet while still providing sufficient resolution to identify objects or items. For example, if the application is monitoring or tracking objects or items at a checkout station or counter of, for instance a grocery store (e.g., on a conveyor belt at the checkout station or counter, and/or in the shopping cart), this area of coverage is not sufficient. In particular, a position of a shopping cart at a checkout station or counter can vary substantially from one checkout transaction to another, or even during a single checkout transaction, making selection of an appropriate 5 foot by 4 foot area for imaging virtually impossible.

Further, sharp image capture is needed for successfully reading linear or one-dimensional machine-readable symbols (e.g., barcode symbols) and/or two-dimensional machine-readable symbols (e.g., area or matrix code symbols). For moving objects, sharp image capture typically requires very fast shutter speeds, which can be impossible using ambient light, leading to the need for expensive and large active illumination systems. Active illumination can interfere with other opto-electronic components of a system or device, and may present an annoyance to human operators.

BRIEF SUMMARY

Global shutter imagers typically have lager pixel size, and are more expensive and noisier than rolling shutter imagers.

Applicants have realized that a smaller, less expensive camera system that requires less light to operate can be implemented, for example, if: 1) an area to be imaged is kept small, and/or 2) relative object motion can be minimized. Such may advantageously allow for lower cost, smaller size, faster tracking, and lower levels of required illumination than existing global shutter imager-based approaches.

In at least one implementation, a field-of-view of an imager or camera, for example a rolling shutter camera, is directed or caused to track one or more objects via a steering mirror, for instance a fast steering mirror. A tracking subsystem may include a tracking imager or camera, or some other sensor(s) or transducer(s) that capture data (e.g., 3-dimensional data) that characterizes objects in an environment, for instance a retail environment. In other implementations, images captured by a first imager may be used to determine characteristics of objects, which characteristics are used to cause a respective field-of-view of the first imager to track one or more objects. Characteristics may, for example, include appearance, presence, location, position, speed, and/or direction of travel of the object. Characteristics may also, for example, include physical characteristics of the object and/or packaging, which characteristics allow classifying the object as a certain type of object (e.g., stock keeping unit or SKU, restricted sale type item). The steering mirror directs the field-of-view of a relatively higher resolution imager with a relatively narrow field-of-view to track an object, for example an object spotted in a wider field-of-view of another imager, and/or an object that is in motion. For moving objects, relative motion between the object and the field-of-view of the higher resolution imager is reduced or eliminated, allowing use of a rolling shutter imager or camera.

Image sensors of rolling shutter imagers typically have smaller pixels than image sensors of global shutter imagers. Rolling shutter imagers typically have lower noise due to the ability to cancel kTC noise, which may otherwise be a dominant noise source. Use of object tracking allows the exposure time of a rolling shutter imager to be longer than would otherwise be possible. Such may advantageously allow use of ambient light or lower levels of active lighting than might otherwise be employed with a global shutter imager.

While some implementations may advantageously employ rolling shutter imagers, for example as the relatively narrow field-of-view imager, other implementations may employ a global shutter image for the relatively narrow field-of-view imager and/or for the relatively wide field-of-view imager. For example, a global shutter imager may be employed as the relatively narrow field-of-view imager in the InCart™ and ShelfHawk™ applications, discussed below.

The relatively smaller pixel size typical of image sensors of rolling shutter imagers may allow a smaller imager package size, with a shorter focal length lens than might otherwise be required. Typically, for an equivalent f-number, the aperture diameter of a rolling shutter imager is smaller than that of a global shutter imager. This can advantageously reduce cost while increasing tracking speed.

The imaging system may be employed in loss prevention, for example in retail environments. For example, two imagers may be employed to cover an area (e.g., checkout station or counter, aisle, game pit), one imager having a relatively wider field-of-view and the other having a relatively narrower field-of-view which is steerable. For instance the relatively narrower field-of-view may be steerable via a steering mirror. The type of steering mirror, and in particular the speed at which the steering mirror can operate, may be a function of the specific application. For example, some applications may have relatively slow moving objects to track or objects that move at a fixed speed (e.g., on a conveyor belt) or a known speed (e.g., speed sensed with one or more encoders), with trigger signals received via one or more sensors or transducers (e.g., photocells, inductive sensors, ultrasonic sensors). In such applications, the steering mirror may take the form of a mechanical motorized platform that allows the imager (e.g., image sensor) to move with respect to an optic assembly. For instance, devices and techniques employed for stabilization in digital single lens reflect (DSLR) cameras may be suitable. Other applications may employ a fast steering mirror, for example the Eagle Eye™ fast steering mirror, developed by DataLogic.

This approach can be employed, for example, as a security camera in retail (e.g., grocery stores, convenience stores) or other locations, advantageously avoiding the need for additional security cameras. This approach can be employed, for example, to advantageously detect objects or items in a shopping cart, shopping basket, or elsewhere at a checkout station or counter. For instance, objects or items left in a shopping cart or shopping basket may be intentionally or unintentionally removed from the retail environment generating an alert to retail personnel to prevent such from occurring. This approach can additionally or alternatively be employed, for example, to advantageously detect, prevent and otherwise deter what is called "sweet-hearting" by retail personnel such as checkout cashiers or clerks. In "sweet-hearting," the cashier or clerk intentionally fails to scan or "ring up" an item, for example pretending to scan or "ring the item up," for customers who are known by or colluding with the cashier or clerk. This allows the customer to steal items in a way that is typically very difficult to detect. Monitoring items at the checkout station or counter, for instance on a conveyer belt, may prevent such. Further, this approach can be employed, for example, to recognize individuals (e.g., customers), including ones that may have previously been banned from the premises, or to provide prompts to personnel allowing customers to be greeted by name or otherwise be recognized. This approach can be employed, for example, to advantageously monitor shopping at locations other than the checkout station or counter of a retail environment. For example, this approach can be employed, for example, to monitor or track the selection of items or objects from shelves and placement into a shopping cart or shopping basket in aisles of a retail environment, allowing better assessment of shopping patterns or purchasing decisions or, conversely, detection of shop lifting. Such could likewise be employed to monitor pick-and-place operations in a warehouse environment, or gaming wagering, card dealing or play in a gaming establishment such as a casino.

An imaging system to image objects in an environment may be summarized as including a first imager having a first imager field-of-view to capture images of the environment; a steering mirror interposed along a first optical path between the first imager and the environment, the steering mirror selectively operable to steer at least a portion of the first imager field-of-view relative to one or more objects in the environment; and an object tracking subsystem that includes at least one hardware processor, the object tracking subsystem communicatively coupled to cause the steering mirror to steer the first imager field-of-view based at least in part on information indicative of at least one of a presence, a position, a speed or a direction of at least one object in the environment to at least partially track objects in the environment. The first imager may be a rolling shutter imager. The first imager may be a rolling shutter imager having a complementary metal oxide semiconductor (CMOS) image sensor and at least one of a mechanical or electronic rolling shutter. The steering mirror may be a fast scanning mirror.

The object tracking subsystem may include a second imager having a second imager field-of-view to capture images of the environment, the first imager field-of-view relatively more narrow than the second imager field-of-view; and a control subsystem, the control subsystem communicatively coupled the second imager to receive information directly or indirectly therefrom, and communicatively coupled to cause the steering mirror to steer the first imager field-of-view based at least in part on information received via the second imager. The object tracking subsystem may detect an entrance of at least a first object into the second field-of-view. The object tracking subsystem may identify an object entering the second field-of-view as corresponding to a defined type of object. The object tracking subsystem may detect an entrance of at least a first object into the first field-of-view. The object tracking subsystem may identify an object entering the first field-of-view as corresponding to a defined type of object. The object tracking subsystem may determine a position of the object. The object tracking subsystem may determine at least an estimate of a speed of the object. The object tracking subsystem may determine a direction of the object. The object tracking subsystem may determine a direction of the object.

The imaging system may further include a steering mirror actuator drivingly coupled to the steering mirror and responsive to signals from the control subsystem of the object tracking subsystem to steer the first imager field-of-view.

The first imager may be a rolling shutter imager having an image sensor and at least one of a mechanical or electronic rolling shutter, the first imager having a higher resolution than the second imager, and may further include a steering mirror actuator drivingly coupled to the steering mirror and responsive to signals from the control subsystem of the object tracking subsystem to concurrently steer an entire field-of-view of the image sensor of the first imager. The control subsystem of the object tracking system may cause the steering mirror actuator to move the steering mirror to an initial scan position at a first speed, then to immediately follow a rolling shutter exposure by panning the sensor at a second speed, the second speed slower than the first speed. The environment may be a retail environment. The retail environment may be a checkout stand with a point-of-sale terminal, and the first and the second fields-of-view may encompass at least a portion of the checkout stand. The retail environment may be a checkout stand with a conveyor belt, and the first and the second fields-of-view may encompass at least a portion of the conveyor belt. The retail environment may be an aisle spaced remotely from a checkout stand, and the first and the second fields-of-view may encompass at least a portion of the aisle. The object tracking subsystem may identify a first object in the first field-of-view as corresponding to a defined stock keeping unit (SKU) of a retail object. The object tracking subsystem may identify a second object in at least one of the first or the second fields-of-view as corresponding to at least one of a shopping cart or a shopping basket in which one or more retail objects reside. The object tracking subsystem may determine whether one or more retail objects are retained in a shopping cart or a shopping basket at a defined point in a retail transaction.

The imaging system may further include a variable focus lens in the first optical path between the first imager and the environment; an illumination source positioned and oriented to illuminate at least a portion of the environment in the first field-of-view; and a polarizer in the first optical path between the first imager and the environment. The system may compensate to recover blur and motion induced artifacts in rolling shutter imagers. The system may additionally or alternatively coordinate operation of wide field-of-view FOV imagers and narrow field-of-view imagers, for example generating coordinates of object of interest in the wide field-of-view that allows tracking in the narrow field-of-view, tracking multiple objects concurrently, and selecting objects including prioritizing objects.

A method of operation in an imaging system to image objects in an environment, the imaging system including a first imager having a first imager field-of-view, a steering mirror interposed along a first optical path between the first imager and the environment, and an object tracking subsystem that includes at least one hardware processor, may be summarized as including detecting at least one of a presence, a position, a speed or a direction of at least one object in the environment by the object tracking subsystem; steering the first imager field-of-view relative to one or more objects in the environment based at least in part on the detecting at least one of a presence, a position, a speed or a direction of the at least one object in the environment to at least partially track objects in the environment; and capturing images of the at least one object by the first imager as the first imager field-of-view is steered.

The method may further include operating the first imager as a rolling shutter imager. The imaging system may include a fast scanning mirror, and steering the first imager field-of-view may include moving the fast scanning mirror.

The object tracking subsystem may include a control subsystem that includes at least one hardware processor and a second imager, the second imager having a second imager field-of-view of the environment, and the method may further include receiving information by the control subsystem directly or indirectly from the second imager; and analyzing the received information by the control subsystem to detect at least one of the presence, the position, the speed or the direction of the at least a first one of the objects in the environment. The detecting by the object tracking subsystem may include detecting an entrance of at least a first one of the at least one object into the second field-of-view. The detecting by the object tracking subsystem may include identifying at least a first one of the at least one object entering the second field-of-view as corresponding to a defined type of object. The detecting by the object tracking subsystem may include detecting an entrance of at least a first one of the at least one object into the first field-of-view. The detecting by the object tracking subsystem may include identifying at least a first one of the at least one object entering the first field-of-view as corresponding to a defined type of object. The detecting by the object tracking subsystem may include determining a position of the first one of the objects. The detecting by the object tracking subsystem may include determining at least an estimate of a speed of the first one of the objects. The object tracking subsystem may include determining a direction of the first one of the objects. The detecting by the object tracking subsystem may include determining a direction of the first one of the objects.

The method may further include providing a control signal by a control system, directly or indirectly, to a steering mirror actuator which is drivingly coupled to the steering mirror to steer the first imager field-of-view. Providing a control signal to a steering mirror actuator may include providing control signals to the steering mirror actuator to move to the steering mirror to an initial scan position at a first speed, then to follow a rolling shutter exposure by panning a sensor at a second speed, the second speed slower than the first speed. The environment may be a retail environment and capturing images of the at least one object by the first imager may include capturing images of a location in the retail environment. Capturing images of a location in the retail environment may include capturing images that encompass at least a portion of a checkout stand in the retail environment. Capturing images of a location in the retail environment may include capturing images that encompass at least a portion of a conveyor belt in the retail environment. Capturing images of a location in the retail environment may include capturing images that encompass at least a portion of an aisle spaced remotely from a checkout stand in the retail environment.

The method may further include identifying a first object in the first field-of-view as corresponding to a defined stock keeping unit (SKU) of a retail object.

The method may further include identifying a second object in at least one of the first or the second fields-of-view as corresponding to at least one of a shopping cart or a shopping basket in which one or more retail objects reside.

The method may further include determining whether one or more retail objects are retained in a shopping cart or a shopping basket at a defined point in a retail transaction.

The method may further compensate to recover blur and motion induced artifacts in rolling shutter imagers. The method may additionally or alternatively coordinate operation of wide field-of-view FOV imagers and narrow field-of-view imagers, for example generating coordinates of an object of interest in the wide field-of-view that allows tracking in the narrow field-of-view, tracking multiple objects concurrently, or selecting objects including prioritizing objects.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with imagers and imaging systems, cameras, computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Figure 1:
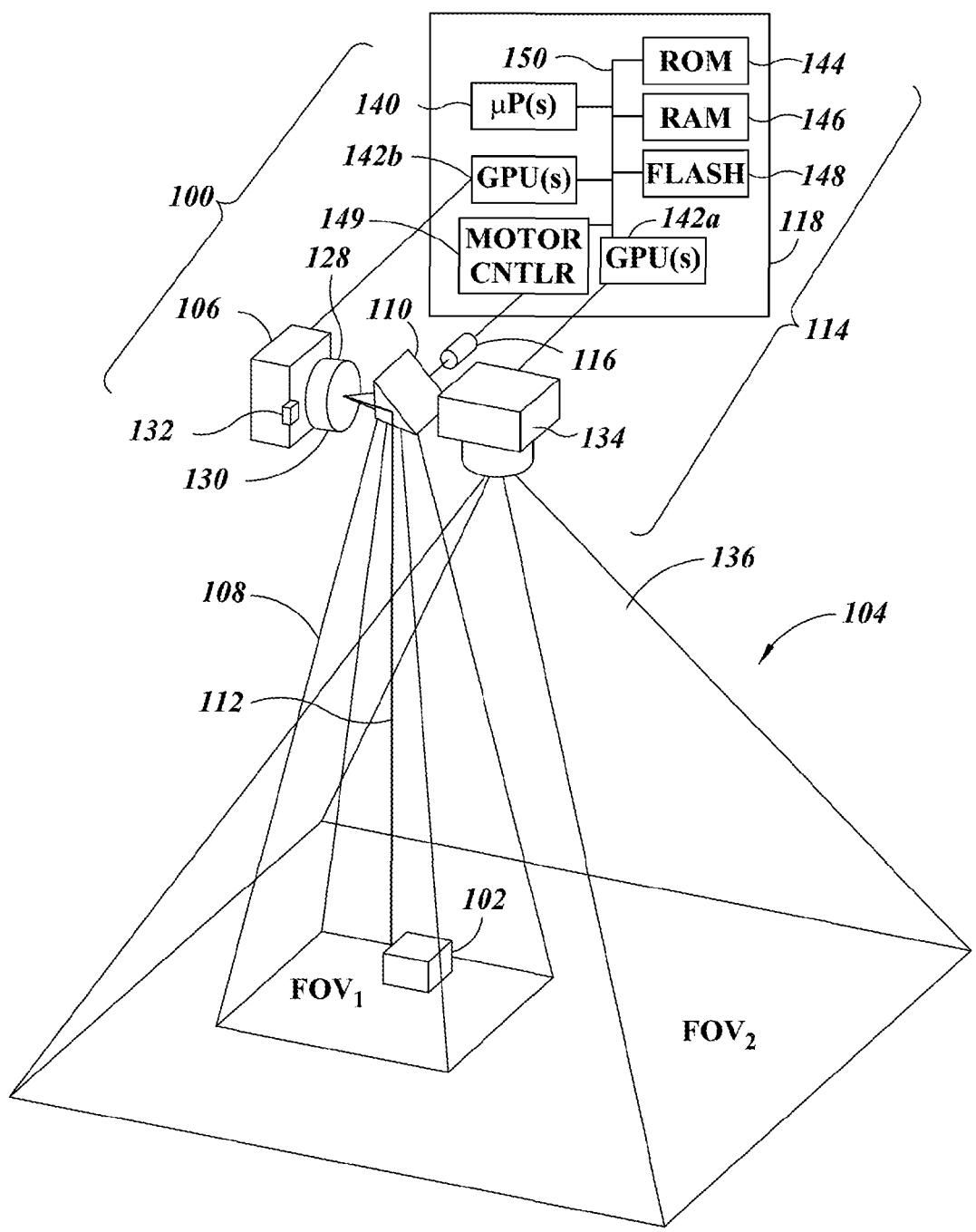
FIG. 1 is a schematic view of an imaging system, according to at least one illustrated embodiment, which may be employed in tracking and/or monitoring objects in an environment, for example a retail environment, the imaging system including a first imager and a second imager with a wider field-of-view than that of the first imager, and an object tracking subsystem to cause the field-of-view of the first imager to track an object in the environment based on information from the second imager.

FIG. 1 shows an imaging system 100, according to at least one illustrated embodiment. The imaging system 100 may be employed in tracking and/or monitoring objects 102 (only one shown in FIG. 1) in an environment 104, for instance objects in a retail environment.

The imaging system 100 includes a first imager 106 having a first imager field-of-view 108 to capture images of the environment 104. The imaging system 100 includes a steering mirror 110 interposed along a first optical path, represented by line 112, between the first imager 106 and the environment 104. The steering mirror 110 is selectively operable to steer at least a portion of the first imager field-of-view 108 relative to one or more objects 102 in the environment 104.

The imaging system 100 includes an object tracking subsystem 114 that includes one or more hardware processors. The object tracking subsystem 114 is communicatively coupled to cause the steering mirror 110 to steer the first imager field-of-view 108 based at least in part on information indicative of at least one of an appearance, a presence, a position, a speed or a direction of at least one object 102 in the environment 104 to at least partially track objects 102 in the environment 104. For example, the object tracking subsystem 114 is communicatively coupled to provide control signals to a steering mirror actuator 116 to cause the steering mirror actuator 116 to move the steering mirror 110 to move the first field-of-view 108 of the first imager 106.

The steering mirror actuator 116 is drivingly coupled to the steering mirror 110 and responsive to signals from a control subsystem 118 to steer the first imager field-of-view 108. The steering mirror actuator 116 may take any of a large variety of forms. For example, the steering mirror actuator 116 may take the form of an electric motor, for instance a stepper motor. Also for example, the steering mirror actuator 116 may take the form of a solenoid. Also for example, the steering mirror actuator 116 may take the form of one or more piezoelectric crystals or elements. Also for example, the steering mirror actuator 116 may take the form of an electromagnetic and a magnetic element (e.g., magnet, ferrous metal). The fast steering mirror 110 may, for example, take the form of the Eagle Eye™ fast steering mirror, developed by DataLogic.

Figure 2:
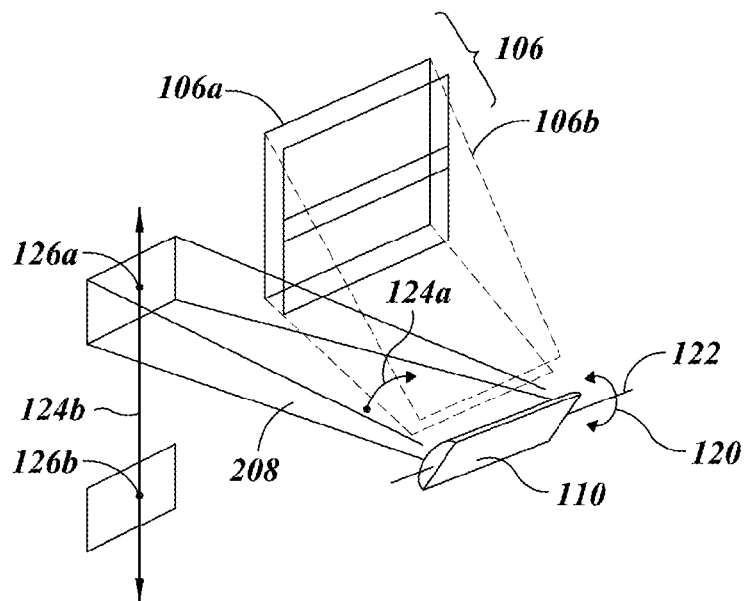
FIG. 2 is an isometric view of an imager of an imaging system, such as that of FIG. 1, which includes a rolling shutter imager comprising an image sensor and either a manual or electronic shutter, according to one illustrated embodiment.

As best illustrated in FIG. 2, the first imager 106 preferably takes the form a rolling shutter imager 106. As compared to a "global shutter" imager, a rolling image shutter imager 106 advantageously employs smaller pixels and lower noise. The rolling shutter imager 106 may include a complementary metal oxide semiconductor (CMOS) image sensor 106a and at least one of a mechanical or electronic rolling shutter 106b. The steering mirror 110 may pivot (as represented by double-headed arrow 120) about a pivot axis 122 to scan the field-of-view 208 of the image sensor 106a as indicated by double-headed arrows 124a, 124b between a first position 226a and a second position 126b. The steering mirror 110 is a fast scanning mirror, for example the Eagle Eye™ fast steering mirror, developed by DataLogic. The steering mirror actuator 116 may be responsive to signals from the control subsystem 118 to concurrently steer an entire field-of-view 208 of the image sensor 106a of the first imager 106. For example, the control subsystem 118 may cause the steering mirror actuator 116 to move the steering mirror 110 to an initial scan position (e.g., 126a) at a first speed, then to immediately follow a rolling shutter exposure by panning the field-of-view 208 of the first image sensor 106a at a second speed, the second speed slower than the first speed.

Returning to FIG. 1, the first imager 106 may optionally include a variable focus lens 128 in the first optical path 112 between the first imager 106 and the environment. 104. Additionally or alternatively, the first imager 106 may optionally include a polarizer 130 in the first optical path 112 between the first imager 106 and the environment 104. Additionally or alternatively, the first imager 106 or the imaging system 100 may optionally include an illumination source 132 positioned and oriented to illuminate at least a portion of the environment 104 in the first imager field-of-view 108.

In the implementation illustrated in FIG. 1, the object tracking subsystem 114 includes a second imager 134 having a second imager field-of-view 136 to capture images of the environment 104. Notably, the first imager field-of-view 108 is relatively narrower than the second imager field-of-view 136.

The control subsystem 118 is communicatively coupled to the second imager 134 to receive information directly or indirectly therefrom. The control subsystem 118 is communicatively coupled, e.g., via steering mirror actuator 116, to cause the steering mirror 110 to steer the first imager field-of-view 108 based at least in part on information received via the second imager 134.

The control subsystem 118 may include one or more controllers or processors, for example one or more microcontrollers or microprocessors 140, graphical processor units (GPUs) 142a, 142b, application specific integrated circuits (ASICs), programmable logic units (PLUs) or programmable gate arrays (PGAs). The control subsystem 118 may include one or more nontransitory storage media, for example one or more non-volatile and/or volatile nontransitory storage media, for instance one or more read only memories (ROM) 144, random access memories (RAM) 146, registers, Flash memory 148, spinning magnetic media and drive, spinning optical media and drive, etc. The one or more nontransitory storage media may store at least one of processor-executable instructions and/or data, which when execute by one or more controllers or processors, causes the controller(s) or processor(s) to perform the algorithms, methods and functions described herein.

The control subsystem 118 may further include one or more motor controllers 149 or other controllers communicatively coupled to control one or more actuators, for instance steering mirror actuators 116. The control subsystem 118 may include one or more wired or wireless ports (not shown) to provide communications with various other elements of components of the imaging system 100, with other components in the environment 104 (e.g., POS terminal, backend inventory tracking system, SKU lookup system) or other components or systems outside the environment 104 (e.g., ordering system, customer tracking system or customer loyalty system). The control subsystem 118 may further include one or more communications paths or channels, for example one or more buses 150, for instance communications buses, power buses, command or instruction buses, address buses, etc. The control subsystem 118 or a portion thereof may form a part of the object tracking subsystem 114.

In some implementations, the object tracking subsystem 114 detects an appearance or entrance of at least a first object 102 into the second field-of-view 136 of the second imager 134. Additionally or alternatively, the object tracking subsystem 114 identifies an object 102 entering the second field-of-view 136 of the second imager 134 as corresponding to a defined type of object (e.g., particular SKU).

Additionally or alternatively, in some implementations, the object tracking subsystem 114 detects an appearance or entrance of at least a first object 102 into the first field-of-view 108 of the first imager 106. Additionally or alternatively, the object tracking subsystem 114 identifies an object entering the first field-of-view 108 of the first imager 106 as corresponding to a defined type of object (e.g., particular SKU).

In some implementations, the object tracking subsystem 114 determines a position of the object 102. The object tracking subsystem 114 determines at least an estimate of a speed of the object 102. Additionally or alternatively, the object tracking subsystem 114 determines a direction of the object 102.

When employing a moving mirror in an object tracking subsystem, e.g., the object tracking subsystem 114, there are several potential sources of motion jitter. For example, a moving mirror and/or imager or camera may be mounted in a manner in which it is subjected to vibration with respect to the object or item being imaged. For example, it is typical to mount an imager or camera from a ceiling via a pole, which subjects the imager or camera to lateral vibrations. To address this type of jitter, the system may employ a multi-axis accelerometer mounted to detect and measure motion of the imager or camera. A processor may employ the measure of motion to correct for the motion jitter in the image, similar to motion or image correction techniques used in smartphones. Also for example, the steering or moving mirror itself may give rise to a second type of motion jitter. A processor may use feedback to eliminate or minimize this type of motion jitter to any desired level. Any residual motion jitter may still be measureable in the sensor signal. In some instances the sensor signal itself may be corrupted with some noise, which limits the accuracy of the feedback system, so cannot effectively be used as an indication or measure of residual motion jitter. As a further example, the motion of the object or item itself may give rise to motion jitter. For that type of motion jitter, the processor may track motion from frame to frame of images captured by the wide field-of-view imager or camera. This may be implemented via an optical flow algorithm, which can be a two-dimensional or three-dimensional motion vector.

Figure 3:
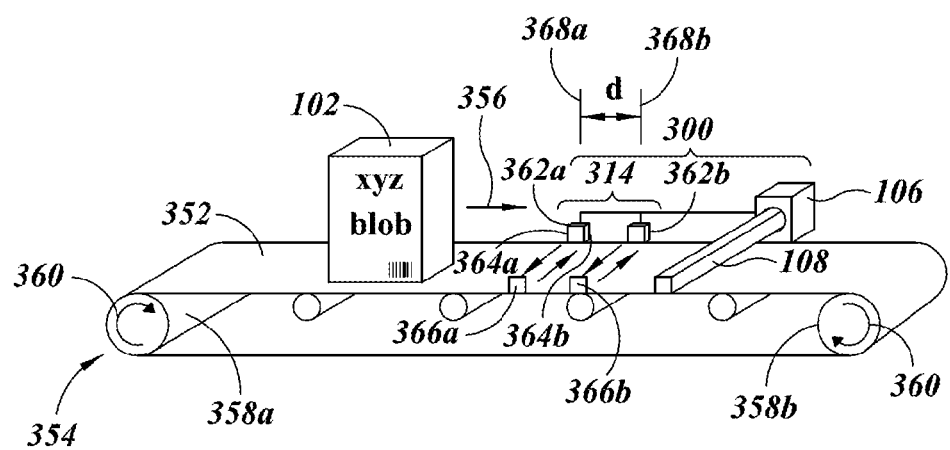
FIG. 3 is a schematic view of an imaging system, according to at least one illustrated embodiment, which may be employed in tracking and/or monitoring objects in an environment, for example a retail environment, the imaging system including a first imager and an object tracking subsystem to cause the field-of-view of the first imager to track an object in the environment based on information from one or more non-image based sensors.

FIG. 3 shows an imaging system 300, according to at least one illustrated embodiment. The imaging system 300 may be employed in tracking and/or monitoring objects 302 on a conveyor belt 352 of a conveyor system 354 in an environment 104, for instance objects in a retail environment 104.

The conveyor system 354 includes a conveyor belt 352 that transports the objects 125 in at least one direction (indicated by arrow 356), as one or more drive wheels or cogs 358a, 358b rotate (illustrated by double-headed arrows 360). In some implementations, the conveyor belt 352 may move in two, diametrically opposed, directions.

The imaging system 300 includes many components that are similar or even identical to those of imaging system 100 (FIG. 1). In the interest of conciseness, only substantial differences are discussed below.

The imaging system 300 includes a first imager 106 with a first imager field-of-view 108. The first imager field-of-view 108 may extend laterally across the path of the conveyor belt 352 at a first position along a path of the conveyor belt 352.

In contrast to the object tracking subsystem 114 of FIG. 1, the imaging system 300 includes an object tracking subsystem 314 that employs sensors other than a second imager. For example, the object tracking subsystem 314 may include one or more non-image based sensors 362a, 362b that detect a presence or passing of one or more objects 102. For instance, one or more pairs of presence/absence sensors 362a, 362b (e.g., light emitter and light receiver pair) are positioned to detect passage of an object 102, for instance on the conveyor belt 352 or similar device. As illustrated, each light emitter 364a and light receiver 364b (only one of each called out in FIG. 3) in a light emitter and light receiver pair 362a, 362b are shown in tandem, next to each other on a same side of the conveyor belt 352, with a respective reflector or mirror 366a, 366b opposed across the conveyor belt 352 from each light emitter and light receiver pair 362a, 362b to reflect light emitted (arrow not called out) by the light emitter 364a of the light emitter and light receiver pair 362a, 362b back (arrow not called out) to the respective light receiver 364b of the light emitter and light receiver pair 362a, 362b, creating a line of light across the conveyor belt 352. Other configurations may be employed. For example, the light emitters 364a and the light receivers 364b may be positioned one above the other. Alternatively, the light emitters 364a and light receivers 364b may be positioned across the width of the conveyor belt 352 from one another. In any of these implementations, the line of light is broken or interrupted by passage of an object 102, giving rise to a signal detectable by the respective light receiver 356b of the light emitter and light receiver pair 362a, 362b.

As illustrated, a first light emitter and light receiver pair 362a may be spaced at a first position 368a along a path of travel (arrow 356) of the object 102 or conveyor belt 352, relatively upstream of the first imager 106. A second light emitter and light receiver pair 362b may be spaced at a second position 368b along the path of travel (arrow 356) of the object 102 or conveyor belt 352, relatively upstream of the first imager 106 and downstream of the first position 368a, at a known fixed distance d from the first position 368a or first light emitter and light receiver pair 362a. The control subsystem 118 of the object detection system may receive signals from the first and the second light emitter and receiver pairs 362a, 362b. The control subsystem 118 may determine an amount or period of time between the object passing the first light emitter and receiver pair 362a or first position 368a and then passing the second light emitter and receiver pair 362b or second position 368b. The control subsystem 118 uses the timing information and known distance d to determine any one or more of an appearance or a presence (e.g., detects passage at first or second positions), a position (e.g., detects passage at first or second position and knows speed of conveyor belt or detects speed of object 102), a speed (e.g., speed=distance/time) and/or a direction of travel (e.g., passes first position before passing second position, or passes second position before passing first position) for the object 102. The control subsystem 118 then generates signals to cause a first field-of-view 108 of the first imager 106 to at least partially track the object 102 over at least a portion of travel of the object 102. This advantageously allows capture of higher resolution pictures than might otherwise be possible, while reducing or eliminating blurring. This advantageously allows effective use of lower cost, smaller imagers or image sensors than might otherwise be possible.

Figure 4:
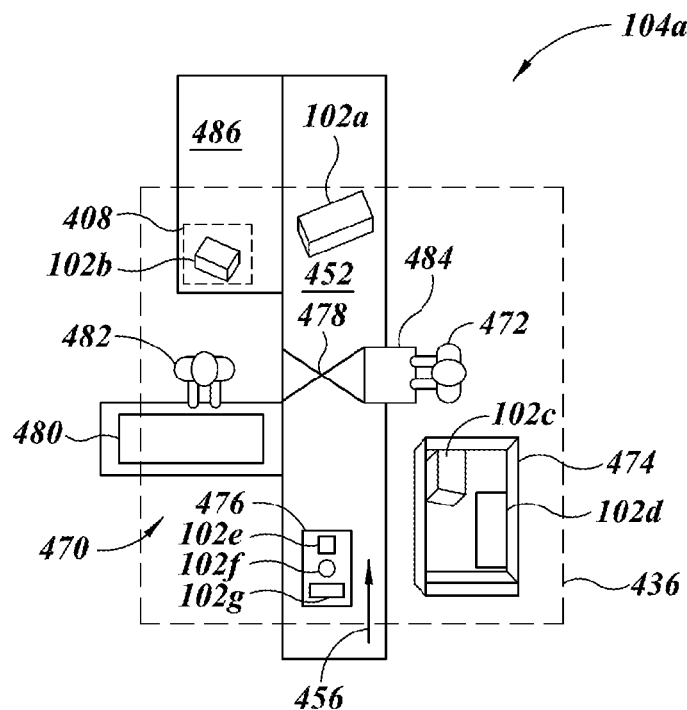
FIG. 4 is a top plan view of a portion of a retail environment in the form of a checkout station or counter, which is monitored via an imaging system such as that of FIG. 1 or 3, according to at least one illustrated embodiment.

FIG. 4 shows a first retail environment 104a in which an imaging system 100, 300 is employed, in the form of a checkout station or counter 470 of a retail establishment, according to one illustrated embodiment.

The retail environment 104a includes a first conveyor belt 452 on which a customer 472 may unload objects 102a-102g (e.g., groceries, packaged goods, retail items) (collectively 102), for example from a shopping cart 474 and/or shopping basket 476. The first conveyor belt 452 moves in a direction indicated by arrow 456. A reader, for instance a machine-readable symbol reader (e.g., barcode symbol reader or scanner) 478 may be positioned to read machine-readable symbols e.g., barcode symbols) from the objects 102. The machine-readable symbol reader 478 may, for example, be built into the first conveyor belt 452 or a counter 470, as illustrated by the X-shaped window through which light (e.g., laser beam(s)) is emitted and returned. Additionally or alternatively, the checkout station or counter 470 may include one or more hand-held machine-readable symbol readers (not illustrated).

The retail environment 104 includes a point-of-sale (POS) terminal 480, which may be operated by a person, such as a cashier or retailer representative 482. The point-of-sale terminal 480 allows transactions to be "rung up" or entered or otherwise executed, including accepting cash payments. As is common in checkout stations or counters, one or more customer facing terminals 484 may be provided to allow the customer to swipe credit or debit cards, execute Near Field Communications (NFC) financial transactions (e.g., Apple-Pay™), enter personal identification numbers (PINs), enter or scan customer loyalty program information, etc.

The retail environment 104 may optionally include a loading area and/or a second conveyor belt 486 on which objects (e.g., groceries, packaged goods, retail items) 102 may be placed, for example immediately before being placed in bags. Typically, the cashier or retail representative 482 places the objects 102 in the loading area or second conveyor belt 486 after scanning or "ringing the objects 102 up" as part of the transaction.

The retail environment 104 may include one or more first or primary imagers (e.g., imagers with relatively high resolution and relatively narrow fields-of-view) and one or more object tracking subsystems, for example as illustrated and described above, for instance with respect to FIGS. 1 and 3 (not illustrated in FIG. 4 in the interest of drawing clarity). While non-imager based object tracking systems (e.g., object tracking subsystem 314 of FIG. 3) may be employed, the embodiment of FIG. 4 is discussed with reference to an imager based object tracking system 114, hence reference to a second imager 134 and a second imager field-of-view 436. Notably, the second imager field-of-view 436 is wider than the first imager field-of-view.

Some implementations may include a respective object tracking subsystem 114, 314 for each first or primary imager 106. Some implementations may share an object tracking subsystem 114, 314 between two or more first or primary imagers 106. In such implementations, the object tracking subsystem 114, 314 may include a second imager 134 that have a field-of-view 136, 436 that encompasses an area that includes areas encompassed by the respective fields-of-view 108, 408 of two or more first or primary imagers 106. Alternatively, in such implementations, the object tracking subsystem 114, 314 may include two or more second imagers 134, that each have respective fields-of-view 136, 436 that encompass respective ones of areas that are encompassed by the respective fields-of-view 108, 408 of two or more first or primary imagers 106.

As illustrated in FIG. 4, the second imager has a second imager field-of-view 436 that encompasses a relatively larger area of the checkout station or counter 470. When the object tracking subsystem 114 detects and object of interest, e.g., object 102b, the object tracking subsystem 114 may provide information or instructions that steer the first field-of-view 408 of the first imager 106 (FIG. 1) to track the object of interest, e.g., object 102b. For example, the object tracking system 114 may identify objects 102, corresponding to a defined stock keeping unit (SKU) of a retail objects, as objects of interest, e.g., object 102b. The objects 102 identified as being of interest may be in the shopping cart 474, in the shopping basket 476, on the first conveyor belt 452, in the loading area and/or on the second conveyor belt 486, or even elsewhere in proximity of the checkout station or counter 470.

The imaging system 100, 300 (may use information discerned from the first imager 106 (FIG. 1) to, for example, determine whether one or more retail objects 102 are retained in a shopping cart 474 or a shopping basket 476 at a defined point (e.g., at or past the machine-readable symbol reader 478) in a retail transaction. The occurrence of this event can cause the imaging system 100, 300 (FIGS. 1, 3) to issue an alert or notification and/or record information indicative of the event as a possible case of "inventory shrinkage," shoplifting, or theft. The imaging system 100, 300 (FIGS. 1, 3) may use information discerned from the first imager 106 (FIGS. 1, 3) to, for example, determine whether one or more retail objects 102 are transferred by the cashier or retail representative 482 to an area (e.g., loading area and/or on the second conveyor belt 486) without being scanned or read, and hence without being tallied for a corresponding payment. This can cause the imaging system 100, 300 to issue an alert or notification and/or record information indicative of the event as a possible case of "inventory shrinkage," shoplifting, or theft. The notifications or alerts may be a visual and/or aural notification or alert. The notifications or alerts may be presented to a cashier or retail clerk and/or to a supervisor or manager. The notifications or alerts may be provided via an electronic notification, for instance electronic mail (email) or short message service (SMS) message or text.

Figure 5:
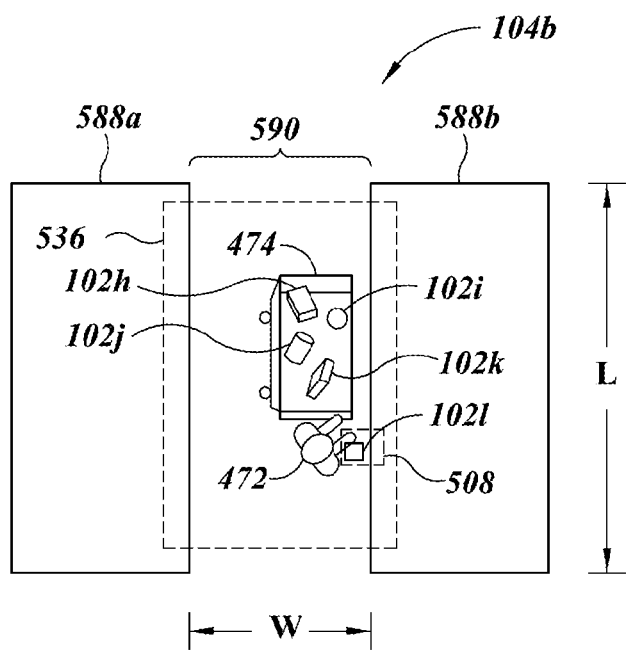
FIG. 5 is a top plan view of a portion of a retail environment in the form of an aisle with sets of shelves, which is monitored via an imaging system such as that of FIG. 1 or 3, according to at least one illustrated embodiment.

FIG. 5 shows a retail environment 104 in which an imaging system 100, 300 is employed, in the form of an aisle, remotely located from a checkout station or counter 470 (FIG. 4) of a retail establishment, according to one illustrated embodiment.

The retail environment 104 includes a first set of shelves 588a and a second set of shelves 588b opposed to the first set of shelves 588a to define an aisle 590 therebetween. The aisle 590 is typically spaced at least a few feet or meters from a checkout station or counter 470 (FIG. 4). The shelves 588a, 588b typically carry a large number of each of a large variety of items or objects for sale (e.g., groceries, packaged goods, retail items) (collectively 102).

A customer 472 may walk down the aisle 590 selecting desired objects 102 for purchase. The customer 472 may, in some cases, employ a shopping cart 474 or shopping basket 476 (illustrated in FIG. 4, not illustrated in FIG. 5) to assist in moving or transporting the items 102h-102k, eventually to the checkout station or counter 470 (FIG. 4).

As illustrated in FIG. 5, a second imager field-of-view 536 of the second imager 134 (FIG. 1, not illustrated in FIG. 5) encompasses a relatively large area of the aisle 590 and/or corresponding sets of shelves 588a, 588b, for example covering a complete width W of the aisle 590 (e.g., dimension between opposed sets of shelves 588a, 588b or perpendicular to the set of shelves 588a, 588b). Less typically, the second imager field-of-view 536 covers a complete length L of the aisle 590 (e.g., dimension measured parallel to the opposed sets of shelves 588a, 588b). When the object tracking subsystem 114 detects an object of interest, e.g., object 102*l*, the object tracking subsystem 114 may provide information or instructions that steer the first field-of-view 508 of the first imager 106 (FIGS. 1, 3) to track the object of interest, e.g., object 102*l*. For example, the object tracking system 114 (FIG. 1) may identify objects 102 corresponding to a defined stock keeping unit (SKU) of retail objects as objects of interest, e.g., object 102*l*. The objects 102 identified as being of interest may, for example, be in the shopping cart 474, in the shopping basket 476 (FIG. 4), held by the customer 472, or even on one of the shelves 588a, 588b.

The imaging system 100, 300 may use information discerned from the first imager 106 (FIGS. 1, 3) to, for example, determine whether one or more retail objects 102 are retained in a shopping cart 474 or a shopping basket 476 (FIG. 4) or returned to a shelf 588a, 588b.

This can cause the imaging system 100, 300 to issue an alert or notification and/or record information indicative of the event as a possible case of "inventory shrinkage," shoplifting, or theft. The notification or alert may be a visual and/or aural notification or alert. The notification or alert may be presented to a cashier or retail clerk and/or to a supervisor or manager. The notification or alert may be provided via an electronic notification, for instance electronic mail (email) or short message service (SMS) message or text.

This can cause the imaging system 100, 300 to track anonymized purchasing habits of customers 472, for instance the amount of time spent making a purchasing decision and/or the types of goods that are studied and either purchased (e.g., placed or left in shopping cart 474 or shopping basket 476) or not purchased (e.g., returned to shelves 588a, 588b) after study by the customers 472. Such may also detect instances or occurrence of shoplifting, for instance where an item is neither returned to a shelf 588a, 588b nor placed in a shopping cart 474 or shopping basket 476.

Figure 6:
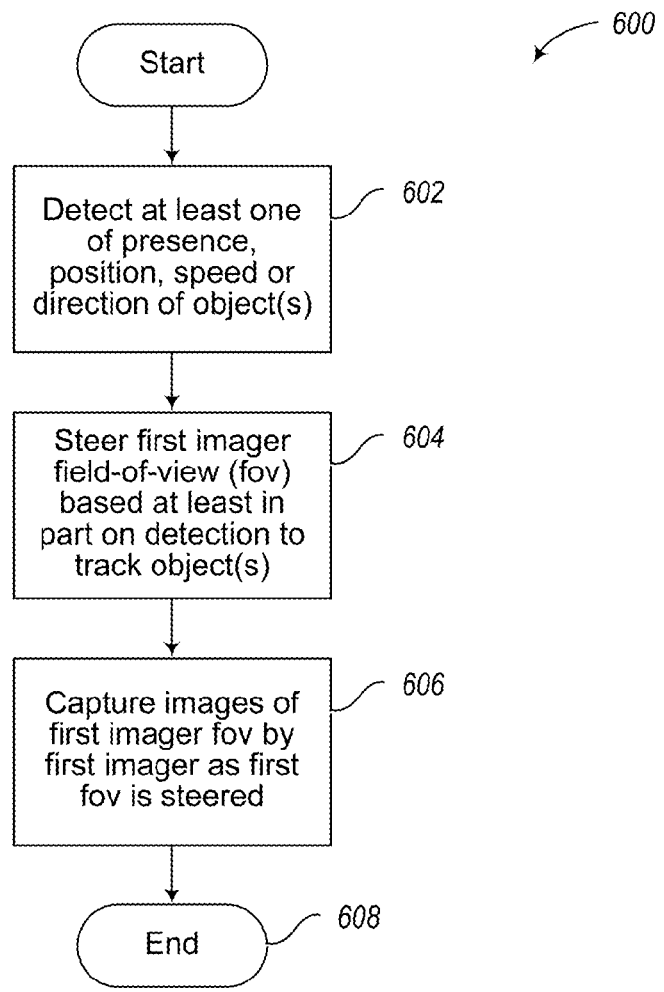
FIG. 6 is a flow diagram of a high level method of operation in an imaging system, according to at least one illustrated embodiment.

FIG. 6 shows a method 600 of operation in an imaging system, for instance the imaging system 100 of FIG. 1, according to at least one illustrated embodiment.

The method 600 starts at 602. For example, the method 600 may start in response to a turning ON of the imaging system 100 or a component thereof, or in response to invocation by a calling routine or program.

At 602, the imaging system 100, or a component thereof, detects at least one of presence, position, speed or direction of one or more objects 102 in an environment 104. For example, the imaging system 100 may include an object tracking subsystem 114 (FIG. 1) to track one or more objects 102 in the environment 104. As discussed above, the object tracking subsystem 114 may take a variety of forms, which employ one or more sensors to detect one or more characteristics of the object(s), including, for instance, appearance, position, location, speed, size, dimensions, images, and/or encoded information (e.g., optically readable machine readable symbols, wirelessly readable (radio) wireless transponders such as radio frequency identification (RFID) transponders).

In one exemplary implementation, a second imager 134 (FIG. 1), which includes a second image sensor, is employed to capture images of a second imager field-of-view 136 (FIG. 1) encompassing an area of the environment 104. The second imager field-of-view 136 encompasses a relatively larger area of the environment 104 than a first imager field-of-view 108 (FIG. 1) of a first imager 106 (FIG. 1).

In another exemplary implementation, one or more sensors detect the appearance, presence or passing of one or more objects. For instance, presence/absence sensors (e.g., light emitter and light receiver pair) 362a, 362b (FIG. 3) may detect passage of an object 102, for instance on a conveyor belt 352 or similar device. Two or more light emitter and light receiver pairs 362a, 362b may be spaced along a path of travel 356 (FIG. 3), and a period of time between passage by a first then a second light emitter and light receiver pair 362a, 362b may indicate the speed and directional of travel.

At 604, the imaging system 100, or a component thereof, steers a first imager field-of-view 108, based at least in part on detection, to track one or more objects in the environment 104.

At 606, a first imager 106 of the imaging system 100, or a component thereof, captures images of the first imager field-of-view 108 as the first field-of-view 108 is steered.

At 608, the method 600 ends or terminates, for instance until invoked again. Alternatively, the method 600 may periodically, aperiodically and/or continuously repeat, for instance until the imaging system 100 is turned OFF. The method 600 may be implemented in one or more threads, executing either concurrently in parallel or sequentially.

Figure 7:
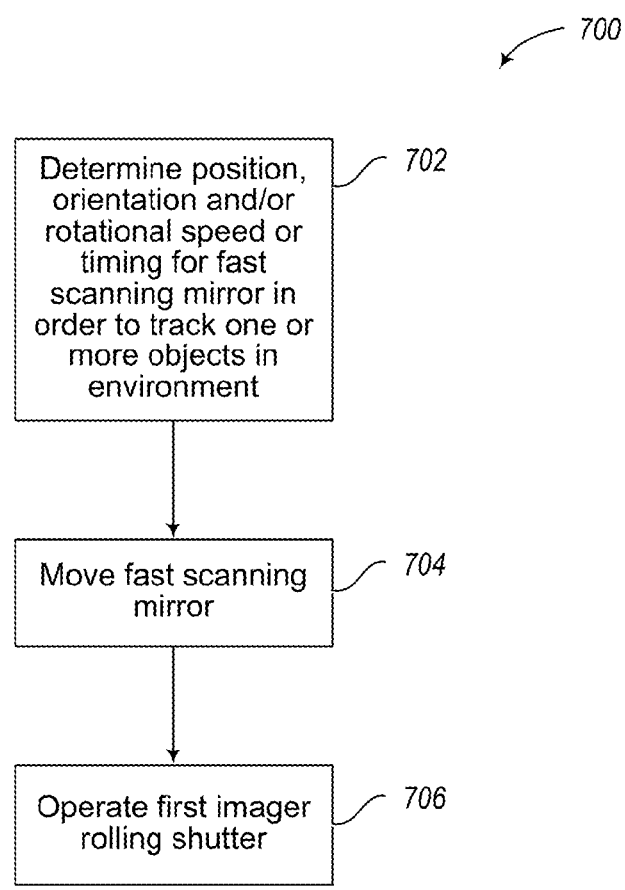
FIG. 7 is a flow diagram of a low level method of operation in an imaging system, to capture images via a first imager while steering a first imager field-of-view, according to at least one illustrated embodiment.

FIG. 7 shows a method 700 of operation in an imaging system, for instance the imaging system 100 of FIG. 1, according to at least one illustrated embodiment. The method 700 may be employed in execution of the method 600 (FIG. 6), for instance to capture images of the first imager field-of-view 108 while steering the first imager field-of-view 108 as at 606 of method 600 (FIG. 6).

At 702, an object tracking subsystem 114, 314 determines a position, orientation and/or rotational speed or timing for the fast scanning mirror in order to track one or more objects in an environment.

At 704, the object tracking subsystem 114, 314 generates or causes to be generated, signals that are applied to move the fast scanning mirror to track one or more objects in an environment. For example, the object tracking subsystem 114, 314 may generate signals that drive a steering mirror 110 via a motor controller 148 (FIG. 1) and a steering mirror actuator 116.

At 706, the control subsystem, or another component of the imaging system 100, 300, operates a rolling shutter of the first imager 106 to sequentially capture images of the environment that is within a field-of-view 108, 308 of the first imager 106.

Figure 8:
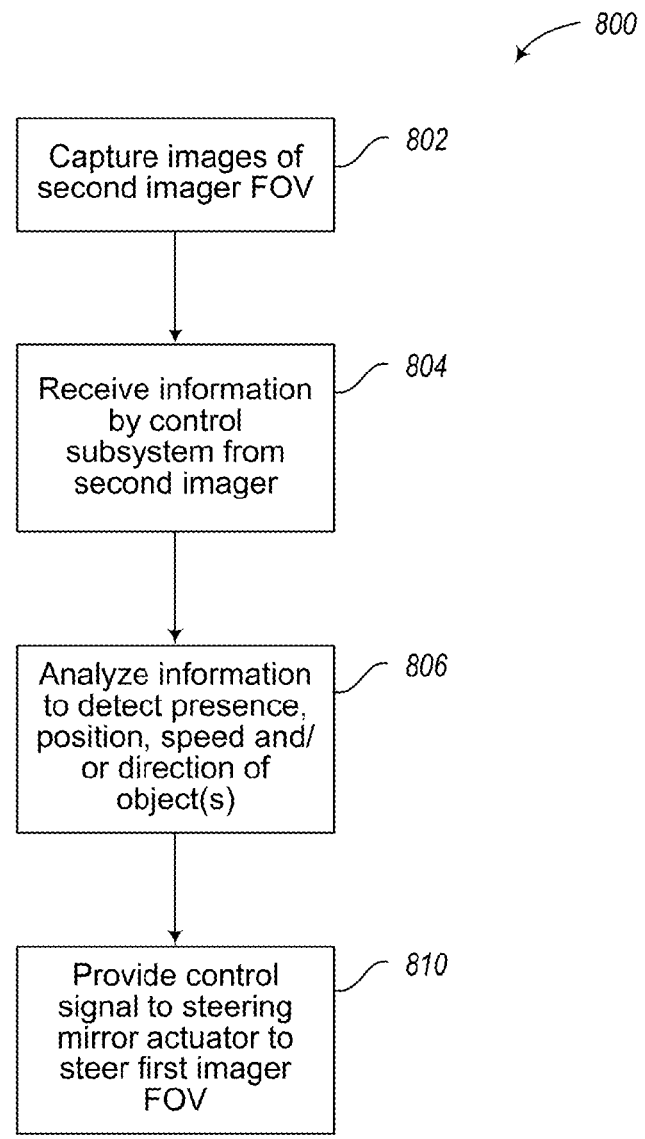
FIG. 8 is a flow diagram of a low level method of operation in an imaging system to detect at least one of presence, position, speed or direction of one or more objects in the environment, according to at least one illustrated embodiment.

FIG. 8 shows a method 800 of operation in an imaging system, for instance the imaging system 100 of FIG. 1, according to at least one illustrated embodiment. The method 800 may be employed in execution of the method 600 (FIG. 6), for instance to detect at least one of presence, position, speed or direction of one or more object in the environment 104 as at 602 of method 600 (FIG. 6).

At 802, a second imager 134 (FIG. 1) captures images of a second imager field-of-view 136. The second imager field-of-view 136 is typically wider or encompasses a larger area than the first imager field-of-view 108.

At 804, the control subsystem 118 receives information from one or more object tracking sensor, for example, the control subsystem 118 may receive information from a second imager 134 (FIG. 1) having a wider field-of-view 136 than a first field-of-view 108 of the first imager 106.

At 806, the control subsystem 118 analyzes the received information to detect an appearance, presence, position, speed and/or direction of travel of one or more objects 102 in the environment 104, for example analyzing information received from the second imager 134 to detect at least one of appearance, presence, position, speed and/or direction of travel of one or more objects 102.

At 808, the control subsystem 118 provides control signals to cause a steering mirror actuator 116 to steer the first imager field-of-view 108 based on the detected appearance, presence, position, speed and/or direction of travel of one or more objects 102.

Figure 9:
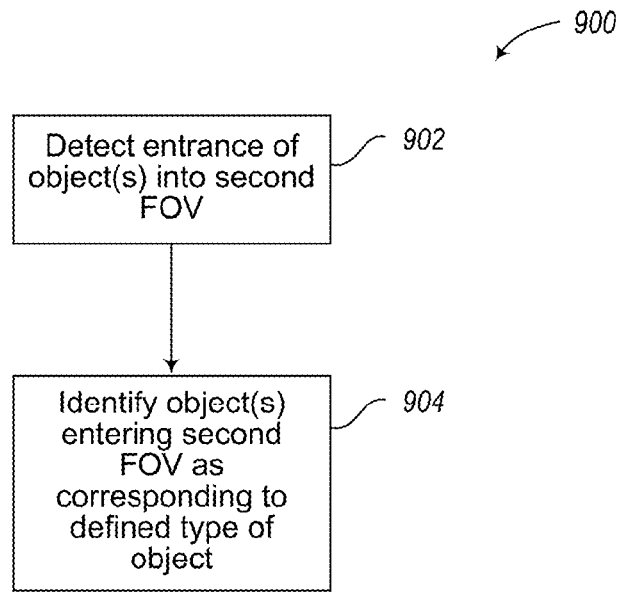
FIG. 9 is a flow diagram of a low level method of operation in an imaging system to detect at least one of presence, position, speed or direction of one or more objects in the environment, according to at least one illustrated embodiment.

FIG. 9 shows a method 900 of operation in an imaging system, for instance the imaging system 100 of FIG. 1, according to at least one illustrated embodiment. The method 900 may be employed in execution of the method 600 (FIG. 6), for instance to detect at least one of appearance, presence, position, speed or direction of one or more objects 102 in the environment 104 as at 602 of method 600 (FIG. 6).

At 902, an object tracking system 114, 314, or a component thereof, detects an appearance or entrance of one or more objects into the second imager field-of-view.

At 904, the object tracking system 114 (FIG. 1), or a component thereof, identifies one or more objects entering the second field-of-view 136 as corresponding to a defined type of object. Such may employ any one or more of a variety of techniques. For example, the object tracking system 114 may employ three-dimensional images and/or structured light to determine a set of values that define the shape and size of the object(s). Also for example, the object tracking system 114 may employ color image processing to identify unique graphical elements, text and/or symbols on the objects. The object tracking system 114 may use various machine-vision techniques (e.g., Sobel filter) on image data, and/or may use various parcel dimensioning techniques to identify objects as corresponding to a particular class of objects (e.g., restricted sale items such as a case of beer, carton of cigarettes). The object tracking system 114 may query a database that stores relationships between characteristic object shapes and dimensions and object descriptors, identifiers or other information specific to the type of object (e.g., price, manufacturer, model, SKU, age restrictions on sale of the product, special promotions, discounts, tax status). Additionally or alternatively, the object tracking system 114 may query a database that stores relationships between characteristic object packaging color(s), logos, text, symbols or graphics and object descriptors, identifiers or other information specific to the type of object (e.g., price, manufacturer, model, SKU, age restrictions on sale of the product, special promotions, discounts, tax status).

Figure 10:
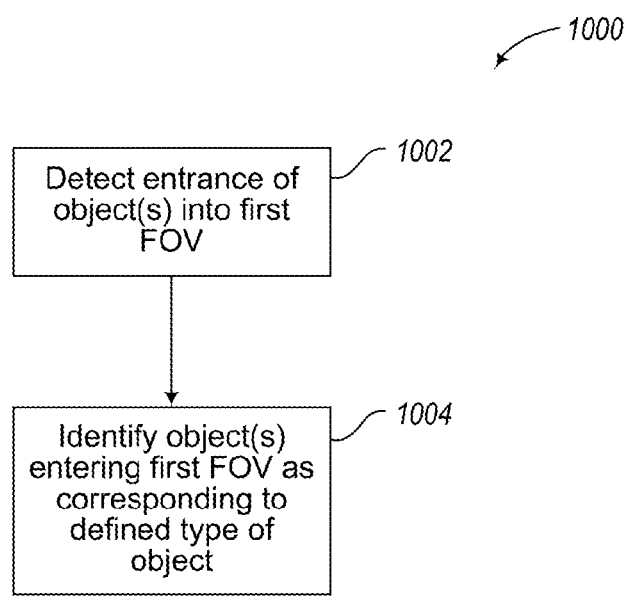
FIG. 10 is a flow diagram of a low level method of operation in an imaging system to detect at least one of presence, position, speed or direction of one or more objects in the environment, according to at least one illustrated embodiment.

FIG. 10 shows a method 1000 of operation in an imaging system, for instance the imaging system 100 of FIG. 1, according to at least one illustrated embodiment. The method 1000 may be employed in execution of the method 600 (FIG. 6), for instance to detect at least one of appearance, presence, position, speed or direction of one or more object 102 in the environment 104 as at 602 of the method 600 (FIG. 6). In contrast to the method 900 illustrated in FIG. 9, the method 1000 employs the first imager to detect at least one of appearance, presence, position, speed or direction of one or more objects 102 in an environment.

At 1002, an object tracking system 114, 314 (FIGS. 1, 3), or a component thereof, detects an appearance or entrance of one or more objects 102 into a first field-of-view 108 of a first imager 106.

At 1004, the object tracking system 114, or a component thereof, identifies one or more objects 102 entering the first imager field-of-view 108 of the first imager 106 as corresponding to one or more defined types of objects 102. Such may employ any one or more of a variety of techniques. For example, the object tracking system 114 may employ three-dimensional images and/or structured light to determine a set of values that define the shape and size of the object(s). Also for example, the object tracking system 114 may employ color image processing to identify unique graphical elements, text and/or symbols on the objects. The object tracking system 114 may use various machine-vision techniques (e.g., Sobel filter) on image data, and/or may use various parcel dimensioning techniques to identify objects as corresponding to a particular class of objects (e.g., case of beer, carton of cigarettes). The object tracking system 114 may query a database that stores relationships between characteristic object shapes and dimensions and object descriptors, identifiers or other information specific to the type of object (e.g., price, manufacturer, model, SKU, age restrictions on sale of the product, special promotions, discounts, tax status). Additionally or alternatively, the object tracking system 114 may query a database that stores relationships between characteristic object packaging color(s), logos, text, symbols or graphics and object descriptors, identifiers or other information specific to the type of object (e.g., price, manufacturer, model, SKU, age restrictions on sale of the product, special promotions, discounts, tax status).

Figure 11:
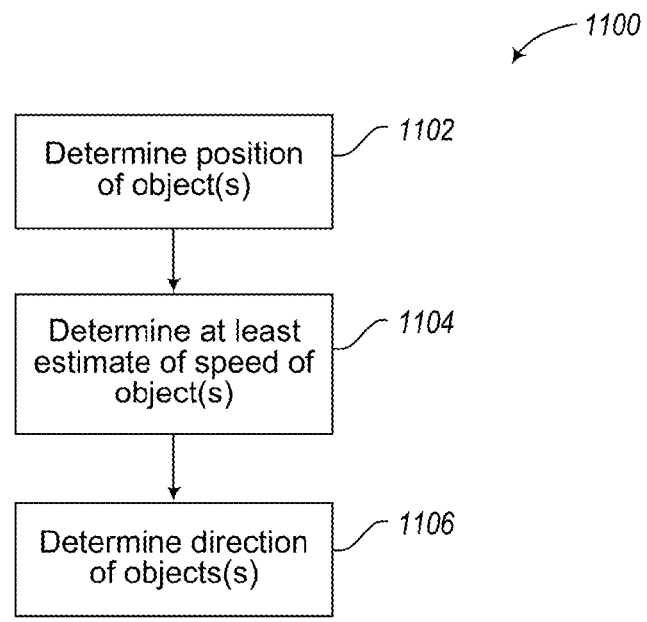
FIG. 11 is a flow diagram of a low level method of operation in an imaging system to detect at least one of presence, position, speed or direction of one or more objects in the environment, according to at least one illustrated embodiment.

FIG. 11 shows a method 1100 of operation in an imaging system, for instance the imaging system 100 of FIG. 1, according to at least one illustrated embodiment. The method 1100 may be employed in execution of the method 600 (FIG. 6), for instance to detect at least one of presence, position, speed or direction of one or more objects 102 in the environment 104 as at 602 at method 600 (FIG. 6).

At 1102, an object tracking system 114, 314 (FIGS. 1, 3), or a component thereof, determines a position of one or more objects 102 in an environment 104.

At 1104, the object tracking system 114, 314, or a component thereof, determines at least an estimate of speed of the object(s) 102. The object tracking system 114 may, for example, use successive images taken at a known time apart to determine a change in position of the object 102. Knowing the distance traveled by the object in a known period of time allows the object tracking system 114 to determine a speed of an object 102 that is in motion. The information also allows the object tracking system 114 to determine any of a location, position, and/or direction of travel of the object 102 that is in motion. Alternatively, the object tracking system 314 may, for example, evaluate an amount of blurriness in an image, and estimate speed and/or direction of travel of an object 102 based at least in part on the evaluation of blurriness. Alternatively, the object tracking system 314 may, for example, detect passage of the object 102 past a first position and a second position which are a known distance apart. The object tracking system 314 may determine a time between the successive passages by the two positions. Knowing the distance traveled by the object in a known period of time allows the object tracking system 314 to determine a speed of an object 102 that is in motion. The information also allows the object tracking system 314 to determine any of a location, position, and/or direction of travel of the object 102 that is in motion.

At 1106, the object tracking system 114, 314, or a component thereof, determines the direction of travel of one or more objects(s) 102. For example, the object tracking system 114 may use successive images to determine a change in position of the object 102, and hence a direction of travel of the object 102. Also for example, the object tracking system 114 may, for example, detect passage of the object 102 past a first position and a second position which have a known relative position (e.g., upstream, downstream) to determine a direction of travel by detecting which position is passed in which order.

Figure 12:
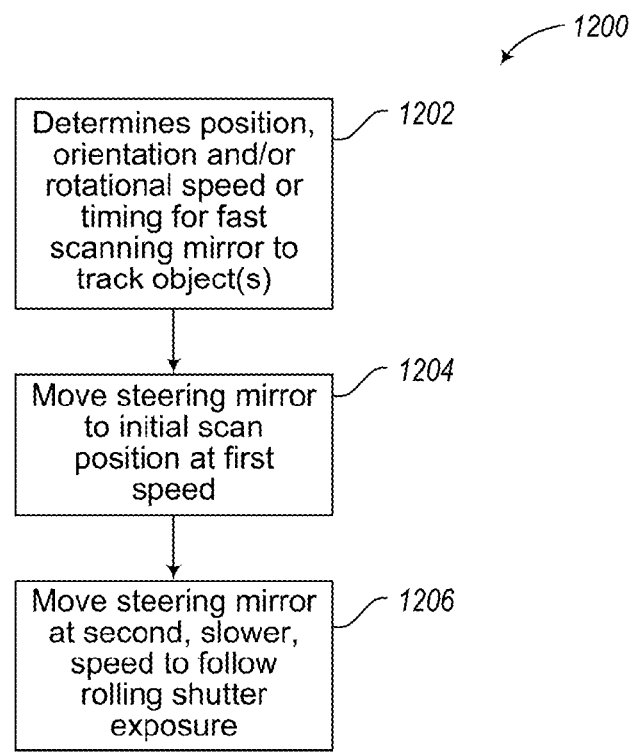
FIG. 12 is a flow diagram of a low level method of operation in an imaging system to steer a first imager field-of-view 108 based at least in part on detection to track one or more objects in the environment, according to at least one illustrated embodiment.

FIG. 12 shows a method of operation in an imaging system, for instance the imaging system 100 of FIG. 1, according to at least one illustrated embodiment. The method 1200 may be employed in execution of the method 600 (FIG. 6), for instance to steer a first imager field-of-view 108 based at least in part on detection to track one or more objects in the environment 104 as at 602 of method 600 (FIG. 6).

At 1202, an object tracking system 114, 314 moves a steering mirror 110 to an initial scan position, at a first speed. For example, the object tracking system 114, 314 may supply signals to control a tracking mirror actuator 116 (FIG. 1) to move quickly into a first position in preparation for tracking an object 102, for example an object 102 that is in motion, or to orient toward an object 102 that is not in motion.

At 1204, an object tracking system 114, 314 moves the steering mirror 110, at second speed, to follow a rolling shutter exposure. The second speed is typically slower than the first speed.

Figure 13:
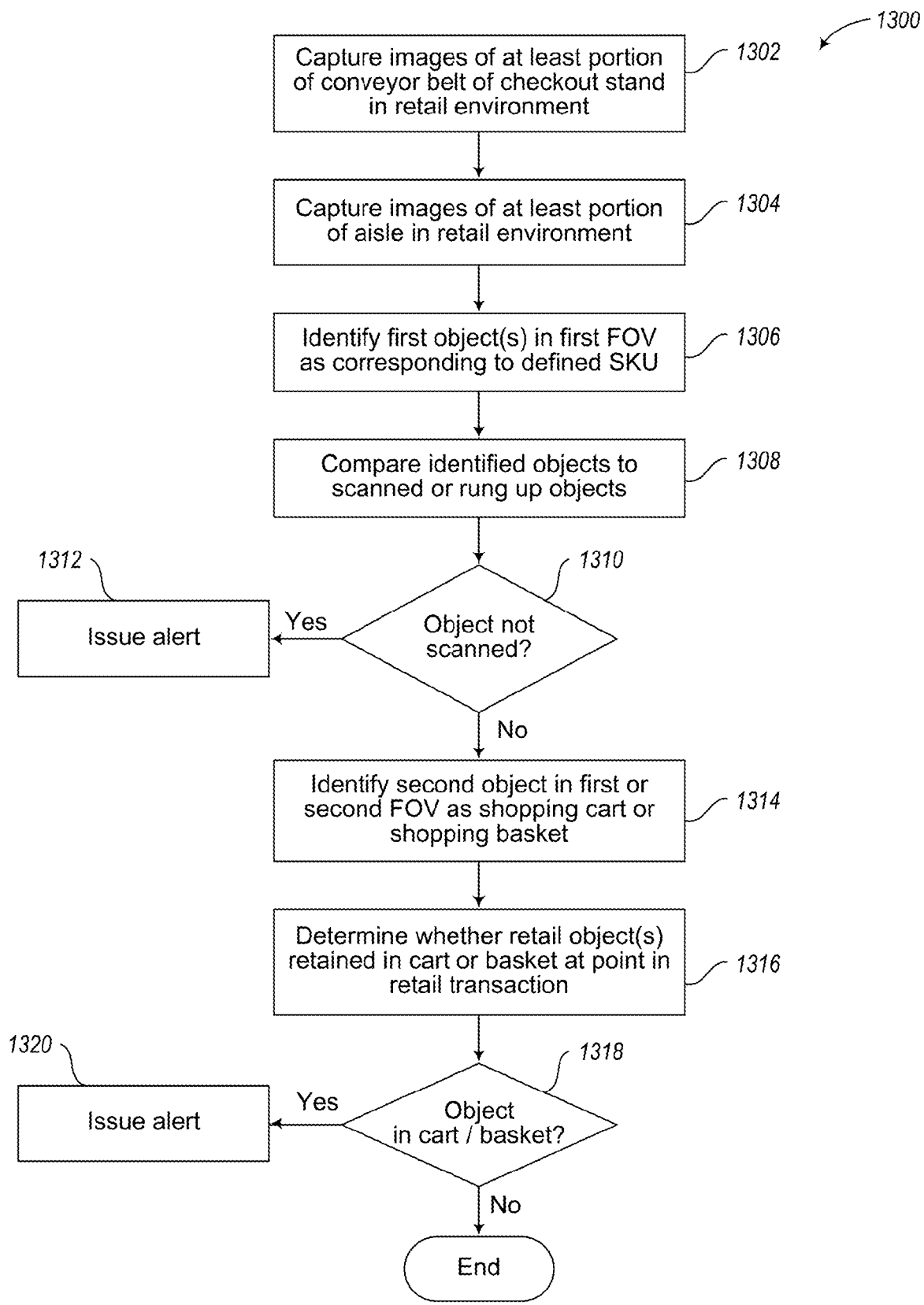
FIG. 13 is a flow diagram of a low level method of operation in an imaging system to steer a first imager field-of-view based at least in part on detection to track one or more objects in the environment, according to at least one illustrated embodiment.

FIG. 13 shows a method 1300 of operation in an imaging system, for instance the imaging system 100 of FIG. 1, according to at least one illustrated embodiment. The method 1200 may be employed in execution of the method 600 (FIG. 6), for instance to steer a first imager field-of-view 108 based at least in part on detection to track one or more objects in the environment 104 as at 602 of method 600 (FIG. 6).

At 1302, the first imager (FIGS. 1, 3) and/or the second imager 136 (FIG. 1) capture images of at least portion of conveyor belt 352, 452 (FIGS. 3, 4) of checkout stand 470 (FIG. 4) in retail environment 104*a*.

At 1304, the first imager 106 and/or the second imager 136 capture images of at least portion of aisle 590 in retail environment 104*b*.

At 1306, the object tracking subsystem 114 identifies a first object 102 in the first field-of-view 108, 408, 508 (FIGS. 1, 3, 4 and 5) as corresponding to a defined stock keeping unit (SKU) of a retail object. The object tracking subsystem 114 may employ any of a large variety of machine-vision or image processing techniques, for example determining a shape, and/or dimensions of the object 102, shapes and/or dimensions of portions of the object 102, text, graphics, symbols on the object 102, reading machine-readable symbols, interrogating wireless transponders, for instance RFID transponders, etc. The object tracking system 114 may use various machine-vision techniques (e.g., Sobel filter) on image data, and/or may use various parcel dimensioning techniques to identify objects as corresponding to a particular class of objects (e.g., case of beer, carton of cigarettes). The object tracking system 114 may query a database that stores relationships between characteristic object shapes and dimensions and object descriptors, identifiers or other information specific to the type of object (e.g., price, manufacturer, model, SKU, age restrictions on sale of the product, special promotions, discounts, tax status). Additionally or alternatively, the object tracking system 114 may query a database that stores relationships between characteristic object packaging color(s), logos, text, symbols or graphics and object descriptors, identifiers or other information specific to the type of object (e.g., price, manufacturer, model, SKU, age restrictions on sale of the product, special promotions, discounts, tax status).

At 1308, the object tracking subsystem 114, or some other component, may compare an object or item identified from the image(s) to a recently (e.g., most-recently) scanned or "rung up" object 102 or item and determine whether they match at 1310. Thus, for example, if an object or item 102 appearing just past the machine-readable symbol reader 478 (FIG. 4) or on the loading area and/or on the second conveyor belt 486 or some other defined location, does not match a scanned or "rung up" object or item 102, the imaging system 100, 300 (FIGS. 1, 3) may issue a notification or alert at 1312 indicating that the object or item 102 was not yet scanned or "rung up." The notification or alert may be a visual and/or aural notification or alert. The notification or alert may be presented to a cashier or retail clerk and/or to a supervisor or manager. The notification or alert may be provided via an electronic notification, for instance electronic mail (email) or short message service (SMS) message or text.

At 1314, the object tracking subsystem 114 identifies a second object 102 in at least one of the first field-of-view 108, 408, 508 (FIGS. 1, 3, 4, 5) or the second field-of-view 136, 436, 536 (FIGS. 1, 4 and 5) as corresponding to at least one of a shopping cart 474 or a shopping basket 476 in which one or more retail objects 102 reside. The object tracking subsystem 114 may use any of the previously described techniques to identify the second object (e.g., shopping cart 474, shopping basket 476).

At 1316, the object tracking subsystem 114 compares the first and the second objects to determine whether one or more retail objects 102 are retained in a shopping cart 474 or a shopping basket 476 at a defined point in a retail transaction. For example, the object tracking subsystem 114 may determine whether a boundary of a first object 102 resides in a boundary of the second object 474, 476 in one or more two-dimensional or three-dimensional images. Alternatively, the object tracking subsystem 114 may determine whether a centroid of a first object 102 resides in a boundary of the second object 474, 476 in one or more two-dimensional or three-dimensional images. At 1318, the imaging system 100, 300 (FIGS. 1, 3) determines whether a retail object 102 remains in a shopping cart 474 or shopping basket. In response to a determination that a retail object 102 remains in a shopping cart 474 or shopping basket 476, the imaging system 100, 300 or some other component may issue a notification or alert at 1320 indicating that the object or item 102 remains in the shopping cart or shopping basket and was not yet scanned or "rung up." The notification or alert may be a visual and/or aural notification or alert. The notification or alert may be presented to a cashier or retail clerk and/or to a supervisor or manager. The notification or alert may be provided via an electronic notification, for instance electronic mail (email) or short message service (SMS) message or text.

Example 1

InCart™ System Application

The InCart™ system is a security system that looks at items in shopping carts and/or shopping baskets and/or elsewhere at a checkout area or checkout lane, for instance while a customer is checking out of a retail environment (e.g., supermarket, grocery store, convenience store, big box store or other retail or warehouse environment). The InCart™ system may employ a wide field-of-view and a narrow field-of-view to track items in the checkout area or checkout lane including those in shopping carts or shopping baskets, on conveyors or on or at machine-readable symbol readers (e.g., barcode symbol scanners). For example, one or more imagers or cameras are mounted, typically in the ceiling, looking down into the shopping cart and/or at the checkout lane. As the shopping cart moves forward in the checkout lane, a narrow field-of-view is moved to track the shopping cart and/or items. For the narrow field-of-view an Eagle Eye tracking image capture system may be used, with a narrow field-of-view imager or camera and tracking mirror. Image processing techniques may be employed to detect items in the shopping cart, if any. Image processing techniques may be employed to detect items on or at the machine-readable symbol reader (e.g., barcode symbol scanner) and/or on the checkout belt to ensure all items are scanned properly.

The InCart™ system may employ at least one wide field-of-view camera, with a field-of-view or fields-of-view that encompass a whole "front end" (e.g., checkout area or checkout lane) including shopping carts, shopping baskets, conveyor belts, loading areas, customers, cashier. One or more processor-based devices (e.g., programmed computer with one or more microprocessors and/or graphic process units) execute processor-executable instructions and/or data stored in or on one or more non-transitory processor-readable media to perform image processing. The processor-based device can determine regions-of-interest (ROI), for example the shopping cart, items on check out conveyor belt or in specific areas such as loading areas upstream or downstream of a machine-readable symbol reader or scanner. The imager or camera is typically mounted in or proximate the ceiling, relatively far away (e.g., 14-22 feet) from the items to be imaged. The items to be imaged in the shopping cart and on the conveyor belt are all about 3 feet above the ground, and thus can effectively be considered planar. Consequently, the system may be considered or operated as a two-dimensional image system, even if using a three-dimensional imager or camera (e.g., time-of-flight camera) or even if using structured lighting.

The processor-based device may, for example, employ scale-Invariant feature transform (Sift) algorithms or packages, allowing the processor-based device to easily match the images or view of the narrow field-of-view ("zoomed in" Eagle Eye™ tracking camera system) with the images or view of the wide field-of-view imager or camera. If the center of the image from the narrow field-of-view imager or camera is at an given X, Y position in the image from the wide field-of-view camera, and needs to move 100 pixels in a given direction (e.g., up), then this would be a known distance/offset, and the system can command the tracking mirror (e.g., tracking mirror of Eagle Eye™ tracking imaging system) to move accordingly. A map of coordinates may be built up and stored, that provides a relationship between each X, Y pair of coordinates in the wide field-of-view images or reference frame and the corresponding x, y pair of coordinates in the narrow field-of-view images or reference frame. Tracking in two-dimensions provides a simplified scenario, although a similar approach may be employed for three-dimensions.

In operation, the system may capture narrow field-of-view images of every item on the checkout belt, either before or after the respective item is scanned or rung up (e.g., machine-readable symbol read). The system can additionally analyze images of each shopping cart or shopping basket, identifying the contents (i.e., each item) thereof. In some implementations, there may be glare from the overhead lights overhead when the imager or camera is positioned overhead. Tracking the items to get a good image may advantageously overcome the problem presented by glare. In some implementations, the system may capture, for example approximately 2 to 3 narrow field-of-view images of each item in the checkout area or checkout lane (e.g., in shopping cart, in shopping basket, on conveyor, at scanner, in load area) per transaction. The mapping between coordinate systems of the wide field-of-view imager or camera and the narrow field-of-view imager or camera may need to be more accurate to capture images of items in motion than to capture images of static items.

Example 2

ShelfHawk™ Application

In the ShelfHawk™ application, imagers or cameras are positioned and oriented to image one or more shelves, for example shelves in an aisle of a supermarket, grocery store, convenience store, big box store or other retail or warehouse environment. The ShelfHawk™ system may include one or more processor-based systems that execute at least one of processor-readable instructions or data stored in one or more nontransitory processor readable media. The processor-based system may analyze images of the shelf or shelves, determining when one or more items normally stocked on the shelf or shelves is out of stock, and in response providing a notification or alert to store personnel and/or to an automated ordering system. In this application, it may be sufficient if the narrow field-of-view (e.g., Eagle Eye™ imager or camera) is moved or scanned across the shelf or shelves in a defined pattern, for example scanning the shelf or shelves, or portion thereof, from left to right, and/or from top to bottom. The processor-based system analyzes the wide field-of-view images captured by a wide field-of-view imager or camera mainly to detect an absence of items or a change of state, causing the narrow field-of-view imager or camera to capture "zoomed" images from the appropriate positions on the shelf or shelves.

As explained above, since the shelf or shelves are essentially planar, the image processing can effectively be treated as a two-dimensional transformation. To build a mapping between the coordinate systems (e.g., X, Y Cartesian coordinates) of the wide field-of-view images and the narrow field-of-view images the processor-based system may cause the tracking mirror of the Eagle Eye™ system to move the narrow field-of-view in a defined pattern, for example from left to right, from top to bottom (i.e., raster scan pattern), over the wide image field-of-view. The processor-based system can thus build a map of X, Y positions in the narrow field-of-view coordinates. Alternatively, the processor-based system may employ a simple linear mapping.

In the ShelfHawk™ application, the wide field-of-view imager or camera can be operated to autonomously repeatedly grab images (e.g., one image per second, or one image per 10 seconds). The processor-based device may perform image processing to determine and if there are any changes detected on the shelf between wide field-of-view images. In response to a detected change, the processor-based device may cause the field-of-view of the narrow field-of-view imager or camera (e.g., Eagle Eye™ system) to move to an appropriate position or orientation and capture a narrow field-of-view ("zoomed in") image of that portion of the shelf or shelves. If the image captured by the narrow field-of-view imager or camera is a bit off of position as compared to the wide field-of-view imager, the processor-based device may adjust the position or orientation of the tracking mirror, and hence the position of the narrow field-of-view accordingly. The processor-based device may once again compare the image captured by the wide field-of-view imager or camera to the image captured by the narrow field-of-view imager or camera, for example using a SiFT algorithm or package. The ShelfHawk™ application tends to be time insensitive.

Coordinating the wide field-of-view with targeting the narrow field-of-view (e.g., Eagle Eye™) via a tracking or moving mirror or other technique could be implemented in a variety of ways. For example, one approach is to employ "up-to-date" images of the whole area encompassed by the field-of-view of the wide field-of-view imager or camera. Images of static objects or items within the wide field-of-view only need to be captured infrequently. However, images of moving objects or items within the wide field-of-view need to be captured (i.e., updated) more rapidly than those of the static objects. This can be implemented by a processor-based device that identifies regions-of-interest (ROI) that correspond to objects or items in motion, and which executes a background task that slowly pans through the field-of-view to handle the static objects, and a foreground task that captures images of the regions-of-interest (ROI). The processor-based device may employ various parameters and thresholds to identify the regions-of-interest, for example motion, direction of motion, speed (e.g., motion above a first threshold rate), etc. Further, processing in the foreground task may be prioritized based on various criteria, for instance prioritized in order of: speed of motion and/or prioritized by size of object or item.

Additionally or alternatively, for many applications there is a sense of what is important, which can be advantageously used by the processor-based system. For example, for a system that performs overhead people tracking which looks at what people are picking up, it is important to identify and focus on a person's hands. This may be implemented in a fairly straightforward manner, for instance performing depth segmentation on three-dimensional image information captured via an overhead three-dimensional imager or camera. The processor-based device may Identify a person's hand or hands in the wide field-of-view imagers, and use the information to cause the field-of-view of the narrow field-of-view camera to move to capture images of the region around people's hands, for example via a tracking mirror. The processor-based system can track multiple objects, for example via a fast steering mirror bouncing between locations from frame-to-frame. When using a relatively slower steering mirror, it may be advantageous for the processor-based system to perform path planning to reduce the total path time needed to capture images of all identified objects.

For example, the processor-based system may determine or generate a path that moves from place-to-place in a circular path instead of bouncing back and forth between objects in a star pattern.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including U.S. provisional patent application Ser. No. 62/222,595, filed Sep. 23, 2015; International Application No. PCT/US2016/053555, filed Sep. 23, 2016, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An imaging system comprising:
   a first imager having a first imager field-of-view to capture images of an environment;
   a steering component configured to steer at least a portion of the first imager field-of-view relative to one or more objects in the environment; and
   an object tracking subsystem configured to:
   scan a plurality of objects that enter the environment to distinguish between objects of the plurality of objects as being either an object of interest or an object not of interest and track the object of interest based on a characteristic of the object of interest; and
   cause the steering component to steer the first imager field-of-view to an initial scan position at a first speed such that the identified object of interest is positioned within the first imager field-of-view and then to pan the first field of view of the first imager at a second speed, the second speed slower than the first speed.

2. The imaging system of claim 1, wherein the first imager is a global shutter imager.

3. The imaging system of claim 2, wherein the characteristic of the object of interest is at least one of an appearance, presence, location, speed, or direction of travel for the object of interest.

4. The imaging system of claim 2, wherein the steering component comprises a steering mirror interposed along a first optical path between the first imager and the environment.

5. The imaging system of claim 2, wherein the object tracking subsystem is configured to provide control signals to a steering mirror actuator to cause the steering mirror to move the first field-of-view of the first imager.

6. The imaging subsystem of claim 2, wherein the steering mirror actuator includes at least one of an electric motor, a solenoid, or a piezoelectric element.

7. The imaging subsystem of claim 2, wherein the first imager includes a variable focus lens.

8. The imaging system of claim 2, wherein the object tracking subsystem comprises a second imager having a second imager field-of-view to capture images of the environment, wherein the first imager field-of-view is relatively more narrow than the second imager field-of-view, wherein the object tracking subsystem is configured to cause the steering component to steer the first imager field-of-view of the first imager based, at least in part on information received from the second imager.

9. The imaging system of claim 2, wherein the object tracking subsystem comprises a non-image based sensor configured to detect objects within the environment, wherein the object tracking subsystem is configured to cause the steering component to steer the first imager field-of-view of the first imager based, at least in part on information received from the non-image based sensor.

10. The imaging system of claim 2, further comprising a plurality of additional primary imagers having their respective fields-of-view and having a steering component associated therewith, wherein the object tracking system is shared by the first imager and the plurality of primary imagers and configured to:
   scan a plurality of objects that enter the environment to distinguish between objects of the plurality of objects as being either an object of interest or an object not of interest and track the object of interest based on a characteristic of the object; and
   cause the steering component associated with one or more of the additional primary imagers to steer the respective field-of-view to an initial scan position at a first speed such that the identified object of interest is positioned within the respective field-of-view and then to pan the respective field of view of the respective additional primary imager at a second speed, the second speed slower than the first speed.

11. The imaging system of claim 2, wherein object tracking system includes at least one second imager having a second field of view that encompasses an area that includes areas encompassed by the respective fields of views of the additional primary imagers, wherein a resolution of the at least one second imager is lower than resolutions for each of the additional primary imagers.

12. The imaging system of claim 2, further comprising a processor configured to use information received from the first imager to detect an exception event and issue an alert or record information about the event in response thereto.

13. The imaging system of claim 2, wherein the object tracking subsystem is disposed within the environment to track objects at one or more of the following locations: on a conveyor belt of a conveyor system, proximate a checkout station of a retail establishment, within a shopping cart or shopping basket within a retail establishment, within an aisle of a retail establishment, or within one or more shelves of a retail establishment.

14. A method of operation in an imaging system to image objects in an environment, the method comprising:
  capturing images of an environment with a first imager having a first imager field-of view;
  steering, with a steering component, at least a portion of the first imager field-of-view relative to one or more objects in the environment;
  scanning, with an object tracking subsystem, a plurality of objects that enter the environment to distinguish between objects of the plurality of objects as being either an object of interest or an object not of interest and track the object of interest based on a characteristic of the object of interest; and
  causing, with the object tracking subsystem, the steering component to steer the first imager field-of-view to an initial scan position at a first speed such that the identified object of interest is positioned within the first imager field-of-view and then to pan the first field of view of the first imager at a second speed, the second speed slower than the first speed.

15. The method of claim 14, further comprising operating the first imager as a global shutter imager.

16. The method of claim 14, further comprising operating the first imager as a rolling shutter imager.

17. The method of claim 14, further comprising detecting, by the object tracking subsystem, an entrance of at least a first one of the plurality of objects into the first field-of-view.

18. The method of claim 14, further comprising:
  providing control signals by a control system, directly or indirectly, to a steering mirror actuator which is drivingly coupled to the steering mirror to steer the first imager field-of-view.

19. The method of claim 14, further comprising:
  identifying, by at least one processor, a region-of-interest in an image captured by a second imager, and determining a set of coordinates to steer the first imager field-of-view to capture images of the region-of-interest.

20. The method of claim 14, wherein the environment is a retail environment and capturing images includes capturing images of a location in the retail environment selected from the group consisting of at least a portion of a checkout stand in the retail environment, at least a portion of a conveyor belt in the retail environment, at least a portion of an aisle spaced remotely from a checkout stand in the retail environment, or at least one of a shopping cart or a shopping basket.

* * * * *